Sept. 4, 1934. R. ELLIS 1,972,554
POULTRY YARD
Filed Dec. 21, 1931
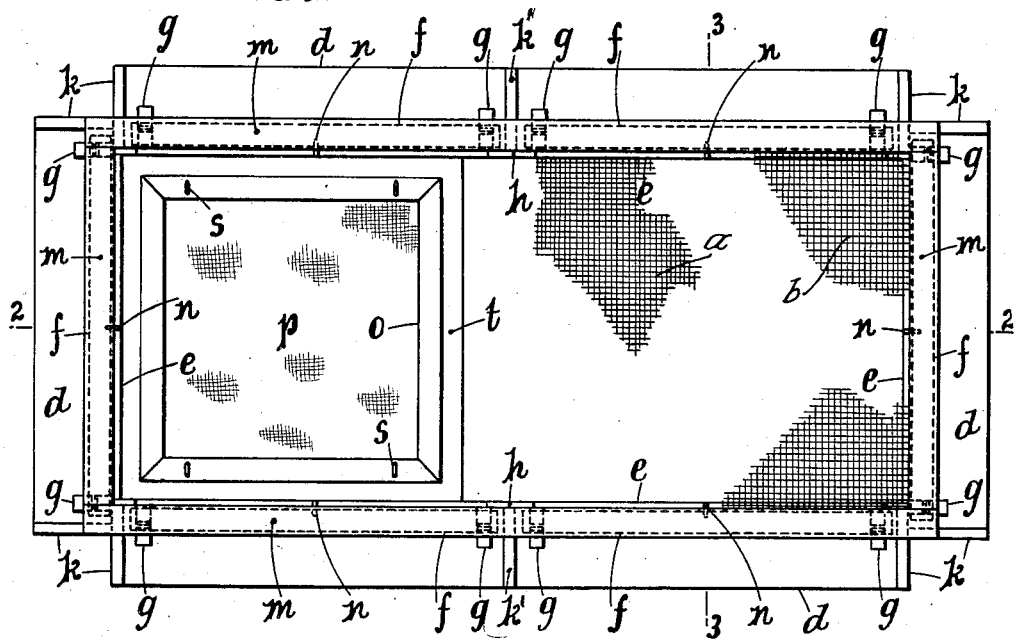
FIG. 1.
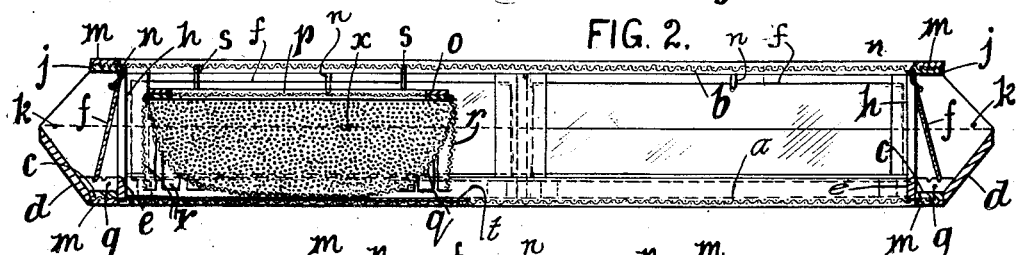
FIG. 2.
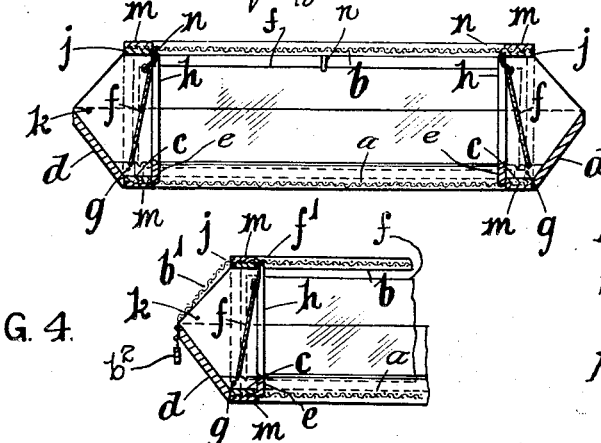
FIG. 3.
FIG. 4.
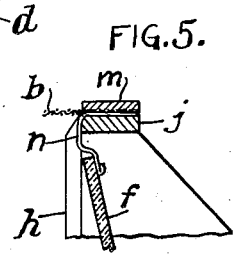
FIG. 5.
Robert Ellis.
INVENTOR
BY Toulmin & Toulmin
ATTORNEYS Patented Sept. 4, 1934

1,972,554

UNITED STATES PATENT OFFICE 1,972,554

POULTRY YARD

Robert Ellis, Blackford, near Carlisle, England

Application December 21, 1931, Serial No. 582,255
In Great Britain December 22, 1930

5 Claims. (Cl. 119—17)

This invention relates to chicken-rearing and similar appliances, and has for its object to provide an improved construction.

Apparatus in accordance with my invention comprises a cage with walls or portions of walls formed by feeding hoppers fitted on their sides next the interior of the cage with readily-removable barriers which permit access to the interior of the cage, serve to store food in quantity, and limit the quantity of food available to the chickens. The removable barriers are transparent and are upwardly and inwardly inclined with respect to the interior of the cage. Each feeding hopper has an outwardly and upwardly inclined back, an upright lip along the front, and an inwardly and upwardly inclined transparent barrier extending above said lip. The bottoms of the transparent barriers are loosely supported by transverse distance pieces serrated to allow variation of the angle of slope of said barriers whereby the width of the feeding space may be adjusted. Drinking troughs are also provided which are of similar formation to the feeding hoppers.

The cage may be used alone, or it may be used in conjunction with a separate hover, or a hover is provided within the cage and comprises a supporting frame having stretched over it a layer of woolen material and having loosely suspended from it an under layer of similar material. Between the upper and lower layers feathers or down are disposed, and a curtain of woolen material is suspended from the edges of the frame. The frame is detachably suspended within the cage.

The accompanying drawing illustrates a chicken-rearing appliance according to my invention. In the drawing Figure 1 is a plan and Figures 2 and 3 are sections on the lines 2—2 and 3—3 respectively in Fig. 1. In Fig. 1, much of the wire-netting forming the roof and floor is removed for clearness. Figure 4 is a part similar view to Fig. 3 illustrating an alternative construction. Figure 5 is an enlarged portion of Fig. 2 illustrating a detail.

Referring to Figs. 1, 2 and 3, in the example therein illustrated, the appliance comprises a rectangular cage provided with a floor $a$ and a roof $b$ of wire-netting or other openwork material, and with sides and ends consisting entirely of hoppers which also serve as openings for access to the interior of the cage, thus dispensing with doors and their disadvantages. The hoppers which form the side and end walls of the cage have comparatively narrow floors $c$ and rearwardly inclined backs $d$. The front of each hopper facing the interior of the cage comprises an upright lip $e$ secured to the floor $c$, the upper edge of said lip being bevelled to prevent the chickens perching or walking along it, and an inclined glass barrier $f$ the lower edge of which is further from the inner side of the hopper than its upper edge and lies slightly below the upper edge of the lip $e$, said glass barrier being loosely supported by transverse distance pieces $g$, the upper faces of which are serrated to allow the angle of slope of the barrier to be varied as may be desired. The upper edge of the barrier rests against suitable stops $h$ adjacent to a narrow top member $j$ running the length or width of the hopper. The ends of the hopper are closed by walls $k$ and the hopper may conveniently be divided lengthwise into suitable sections by means of upright partitions $k'$ intermediate of its ends. The edges of the floor netting $a$ and of the roof netting $b$ are suitably attached to the floors $c$ and top strips $j$ of the side and end hoppers by clamping strips $m$ attached thereto, and these strips $j$ and $m$ and the floor $c$ and inclined backs $d$ serve to form a strong and rigid but light rectangular framework which is stiffened by the divisional partitions $k'$. The glass barrier $f$ is held against being pushed outwards from inside the cage by catches $n$ (shown best in Fig. 5) which can be readily swung clear when it is desired to remove the glass. If desired, and as shown in Fig. 4, the glass barrier $f$ may be hung by a leather hinge $f^1$ from the top member $j$ of the hopper, and the roof netting $b$ may be extended as indicated at $b^1$ to cover over the openings between the upper edges of the backs $d$ and the strips $j$ for the purpose of preventing rats or other vermin getting at the food in the hoppers, the edges of the extended netting $b^1$ are not fastened down but are held down by weights such as $b^2$ (Fig. 4).

Some of the hoppers are charged with water and form drinking troughs, and meal or other food is stored behind the glass barriers $f$ of the other hoppers from which it gravitates so as to fill the narrow space between the lower edge of the glass barrier $f$ and the lip $e$, which is the feeding space, the bulk of the food resting between the inclined back $d$ and the glass barrier where it is in full view of the chickens thus attracting them and encouraging them to eat. As the food in the feeding space is consumed, it is automatically replenished by food falling from the bulk behind the glass barrier $f$, but, as only a small portion is available at any time, wastage is avoided. The supply can be varied by varying the angle and height of the glass barrier.

The co-action of the lip $e$ and the inwardly-sloped glass barrier $f$ prevents the chickens getting into the food and water and also prevents them fouling the same with excrement. The chickens cannot escape from the cage through the hoppers, and side-draughts are prevented. Ready access to the interior of the cage is obtained by temporarily bodily removing any one of the glass barriers $f$. As the floor $a$ of the apparatus is composed of netting or openwork material, excrement and spilt food drops therethrough, the whole structure being constructed and arranged with a view to avoiding places where exrcement or soiled food can lodge.

The dimensions of the cage are varied to suit the size of the chickens; for example, a smaller size of cage is adapted to take newly-hatched chickens, a medium size of cage receives the chickens at say four weeks old and accommodates them through the growing and fattening period, and a larger size of cage receives the fowls when laying and breeding.

The construction illustrated in the drawing shows a receptacle for newly-hatched chickens and is provided with a hover comprising a rectangular frame $o$ of suitable size to which are attached the edges of two layers of flannel $p$, $q$. Feathers, down or similar light material $x$ is placed in the space between said layers and the lower layer $q$, being loosely suspended, touches the chickens when they are resting or sleeping below it. Around the edges of the frame are suspended curtains $r$ of flannel slit vertically from the bottom at interals to allow the chickens easy access and exit to and from the hover. The frome $o$ forming the roof of the hover is suspended from the wire netting $b$ by means of adjustable hooks $s$ or similar readily detachable fastenings, and can be hung in any desired position in the cage. The hover is completed by loosely laying on the floor of the cage a sleeping mattress $t$ of felt or flannel. The frame $o$ and mattress $t$ of the hover can be readily placed in position by removing one or more of the glass barriers $f$ of the hoppers and said frame and mattress are intended to be retained in the apparatus only so long as may be necessary and to be removed so soon as the weather and stamina of the chickens permit.

In extremely cold weather or when delicate or recently-hatched chickens are being reared, artificial heat may be applied to the hover.

By reason of the length of food hoppers provided and the fact that the food is always visible to the chickens and there is ample room for them to feed without crowding together, it will be found that chickens reared and kept in my appliance are healthy, strong and hardy, and that losses are reduced to an extreme minimum. There can be no contamination of the food by excrement, and there is thus no risk of the chickens eating droppings. There is no excess heat in the hover, and the inmates are free to leave it at any time should they become too warm. As the floor of the cage is of openwork material, there is a free circulation of air through the cage, and, if the chickens climb over each other, the bottom chickens in a heap can always breathe and risk of suffocation is eliminated.

It will be understood that my appliance can be used with equal advantage for rearing ducklings, pheasants and other animals.

What I claim and desire to secure by Letters Patent is:—

1. A rearing appliance comprising a cage with openwork floor and roof and bounded at the sides and ends by feeding hoppers, said hoppers having on their sides next the interior of the cage readily-removable upstanding barriers permitting access to the interior of the cage, means for supporting the lower edges of said barriers in spaced relationship to the floors of said hoppers, and means for holding said barriers in place.

2. A rearing appliance comprising a cage with openwork floor and roof and bounded at the sides and ends by feeding hoppers, said hoppers having on their sides next the interior of the cage readily-removable inwardly and upwardly inclined transparent barriers permitting access to the interior of the cage, means for supporting the lower edges of said barriers in spaced relationship to the floors of said hoppers, and means for holding said barriers in place.

3. A rearing appliance comprising a cage with openwork floor and roof and bounded at the sides and ends by feeding hoppers, said hoppers having on their sides next the interior of the cage readily-removable inwardly and upwardly inclined transparent barriers permitting access to the interior of the cage, said barriers cooperating with the hoppers to store food in quantity and to limit the quantity of food available, and means for supporting said inclined transparent barriers which allow adjustment of their angle of slope.

4. A rearing appliance comprising a cage with openwork floor and roof and bounded at the sides and ends by feeding hoppers, said hoppers having on their sides next the interior of the cage readily-removable inwardly and upwardly inclined transparent barriers permitting access to the interior of the cage, said barriers cooperating with the hoppers to store food in quantity and to limit the quantity of food available, and means for supporting said inclined transparent barriers which allow adjustment of their angle of slope, said means comprising serrated transverse distance pieces fitted in said hoppers.

5. A rearing appliance comprising a cage with openwork floor and roof and bounded at the sides and ends by feeding hoppers, said hoppers having on their sides next the interior of the cage readily-removable inwardly and upwardly inclined transparent barriers permitting access to the interior of the cage, said barriers cooperating with the hoppers to store food in quantity and to limit the quantity of food available, and a hover comprising a frame supported by the roof of said cage above the floor, layers of woolen material supported by the frame, and feathers or down disposed between said layers.

ROBERT ELLIS.